United States Patent
Mixon

Patent Number: 5,816,281
Date of Patent: Oct. 6, 1998

[54] BRAKE BLEEDING TOOL

[76] Inventor: Charles S. Mixon, 1218 Dona, Corpus Christi, Tex. 78407

[21] Appl. No.: 803,620

[22] Filed: Feb. 21, 1997

[51] Int. Cl.[6] .................................................. F16K 15/18
[52] U.S. Cl. ............................ 137/14; 137/351; 137/559; 137/614.2; 188/352
[58] Field of Search ................................ 137/614.2, 559, 137/843, 351, 14; 188/352

[56] References Cited

U.S. PATENT DOCUMENTS

| | | | |
|---|---|---|---|
| 1,084,753 | 1/1914 | Owens | 137/559 |
| 2,611,387 | 1/1952 | Legerski . | |
| 2,771,093 | 1/1956 | Wilson | 137/614.17 |
| 3,889,710 | 6/1975 | Brost | 137/525 |
| 4,479,511 | 10/1984 | Holland | 137/614.2 |
| 4,651,780 | 3/1987 | DiVicenzo | 137/559 |
| 4,804,017 | 2/1989 | Knapp | 137/614.2 |
| 4,834,140 | 5/1989 | Schmidt | 137/614.17 |
| 4,989,636 | 2/1991 | Sulwer | 137/614.2 |

OTHER PUBLICATIONS

Cal–Van Tools package and device entitle One–man brake bleeder, Jan. 1997.
Actron Mfg. Co. package (front and back) and device entitled SUNPRO brake bleeder kit, Jan. 1997.

*Primary Examiner*—A. Michael Chambers
*Attorney, Agent, or Firm*—G. Turner Moller

[57] ABSTRACT

A brake bleeding tool allows one person to bleed the hydraulic lines leading to a vehicle wheel cylinder. A check valve allows hydraulic fluid and air to pass out of the wheel cylinder when the brake pedal is depressed and prevents back flow when the brake pedal is released. In one embodiment, a hose connects the check valve to the wheel cylinder and, in another embodiment, a rigid connector connects the check valve to the wheel cylinder. The hose or the rigid connector includes a permanent air trap preventing air bubbles from moving by gravity back into the wheel cylinder when brake fluid flow stops. The air trap is transparent so the air bubbles can be seen. The air trap is such that pumping hydraulic fluid through it purges air in the air trap.

14 Claims, 1 Drawing Sheet

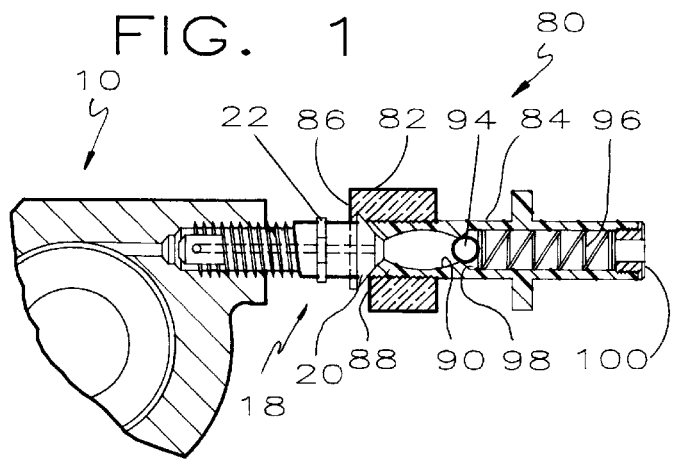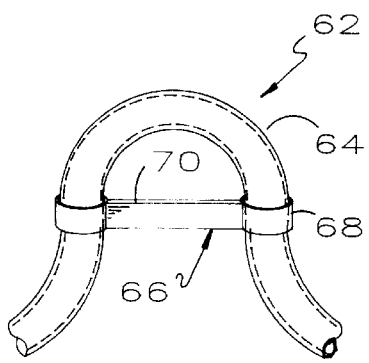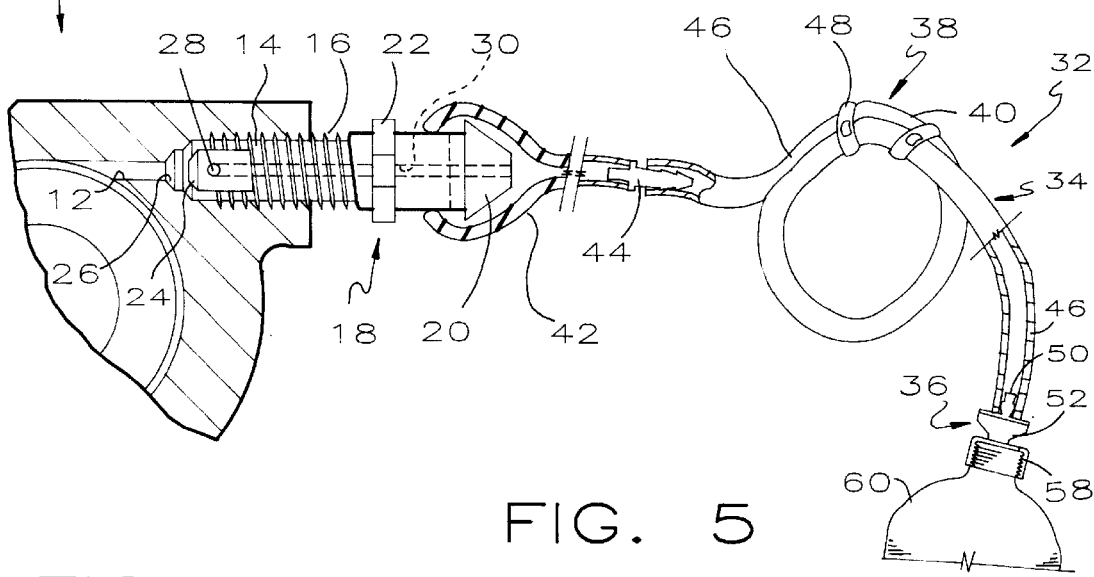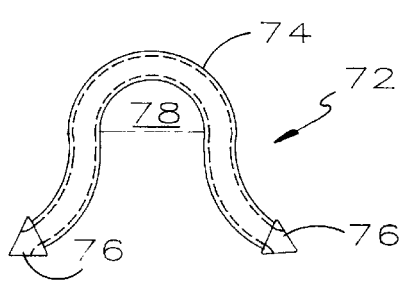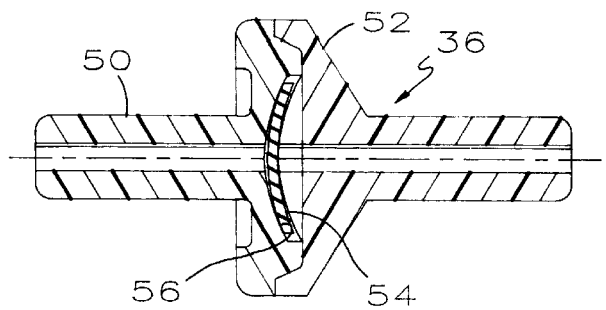

BRAKE BLEEDING TOOL

This invention is a tool for bleeding a hydraulic line leading to a brake wheel cylinder.

BACKGROUND OF THE INVENTION

When working on hydraulic brakes of a conventional vehicle, it is necessary to bleed hydraulic fluid from the brake lines leading from the master cylinder to the wheel cylinders in order to get all of the air out of the brake lines. With air in one or more of the brake lines, considerable effort is spent first in compressing the air before any movement of the braking components occurs. This causes the brake pedal to be spongy, i.e. the pedal goes part way down without noticeable effect because air in the hydraulic line is being compressed.

The standard technique for bleeding brake lines is to attach a hose to the bleed fitting of the wheel cylinder. One person gets inside the vehicle to work the brake pedal and a second person gets under the car to open and close the bleed fitting, which is a valved connection. The person under the car opens the bleed fitting valve and yells to the person in the car to depress the brake pedal. The second person puts the end of the hose in a container and watches the hose end. When fluid quits exiting from the hose end, the second person closes the bleed fitting and yells to the first person to release the brake pedal. If air and brake fluid were seen by the second person exiting from the hose, the process is repeated. The remaining brake lines are bled if the other wheel cylinders have been worked on or other brake lines are thought to have air in them.

It is recommended by vehicle manufacturers that the brake fluid be periodically flushed from the system. This is done by pumping the old brake fluid from the master cylinder adding new brake fluid to the master cylinder. The old brake fluid is easily detectable because it is dark while new brake fluid is clear. Thus, brake fluid emitting from the hose end is easily determined to be old or new.

The standard technique requires two people—one to depress and release the brake pedal on command and one to handle the hose, open and close the bleed fitting, tell the first person when to depress the brake pedal and also to see if any bubbles are coming out of the hose end. It has long been recognized as desirable to provide a tool allowing one person to bleed the brake lines. Typical tools allowing one person to bleed a brake line include a fitting for connection to the bleed fitting on the wheel cylinder and a check valve allowing brake fluid to pass out of the wheel cylinder in response to depression of the brake pedal and preventing back flow toward the wheel cylinder when the brake pedal is released. Such devices are found in U.S. Pat. Nos. 2,611,387; 2,771,093; 4,479,511; 4,834,140 and 4,989,639.

SUMMARY OF THE INVENTION

The brake bleeding tool of this invention comprises a tool fitting for attachment to the bleed fitting of a wheel cylinder, a check valve allowing brake fluid to flow out of the tool fitting toward the check valve and a connection between the check valve and tool fitting including an air trap preventing air from moving by gravity toward the wheel cylinder when flow in the tool stops. The air trap includes a transparent section allowing visual inspection to determine if any air is in the trap. The check valve connects to a receptacle for collecting brake fluid emitting from the tool.

The brake bleeding tool of this invention allows one person to bleed the brakes. The tool is attached to the bleed fitting of the wheel cylinder and the bleed fitting manipulated to allow brake fluid to pass into the tool. The mechanic gets into the vehicle and pumps the brake pedal. Hydraulic fluid and any air in the brake line passes out of the brake system, through the tool and into the receptacle. When the mechanic thinks all of the air is out of the hydraulic lines, he stops pumping, gets out of the vehicle and looks at the air trap. If there is no air in the air trap, then the brake line has been purged and the bleeding operation is over. If there is air in the air trap, the mechanic gets back into the vehicle and pumps the brakes some more. This process is repeated until no air appears in the air trap.

Thus, with the tool of this invention, one person can bleed the wheel cylinders and know when air has been purged from the brake line. It is not sufficient to rely on whether the brakes are "spongy" or not. This is an unreliable indicator when more than one wheel cylinder has been repaired or replaced because one does not know which brake line contains air, i.e. the brake line being bled may be free of air and the spongy feel of the brake pedal is due to air in another brake line.

The bleed fittings of modern wheel cylinders include a frustoconical end and are designed to receive an elastic hose end slipped over the frustoconical end and retained in place by the elasticity of the hose end. Conventional ball check valves are not desirable with this type connection because the pressure applied to the hydraulic fluid necessary to open the ball check may be sufficient to pull the hose end off the bleed fitting. The check valve of this invention, when used with an elastic hose end connection, is of the diaphragm type requiring no more than about 1 psi pressure differential to move the diaphragm to the open position.

It is an object of this invention to provide a brake bleeding tool allowing one person to bleed the brakes of a vehicle.

Another object of this invention is to provide a brake bleeding tool incorporating an air trap so the user can see if any air remains in the brake fluid.

A further object of this invention is to provide an improved brake bleeding tool incorporating a push-on elastic hose fitting for connection to a wheel cylinder and a diaphragm type check valve.

These and other objects and advantages of this invention will become more apparent as this description proceeds, reference being made to the accompanying drawings and appended claims.

BRIEF DESCRIPTION OF THE DRAWINGS

FIG. 1 is a pictorial view, partly in section, of a brake bleeding tool of this invention connected to a bleed fitting of a conventional wheel cylinder, the left side of FIG. 1 being to a larger scale than the right side;

FIG. 2 is an enlarged view of another type of air trap of this invention;

FIG. 3 is an enlarged view of another type of air trap of this invention;

FIG. 4 is a cross-sectional view of a brake bleeding tool of this invention connected to a bleed fitting of a conventional wheel cylinder; and FIG. 5 is a cross-sectional view of a preferred check valve used in this invention.

DETAILED DESCRIPTION

Referring to FIG. 1, a fragment of a conventional brake cylinder 10 which is often known as a wheel cylinder to distinguish it from the master cylinder. The wheel cylinder 10 provides a bleed opening 12 terminating in an internally threaded opening 14 receiving an externally threaded end 16 of a conventional bleeder valve 18. The bleeder valve 18 has a tapered, approximately frustoconical, fitting 20 that is designed to receive the end of an elastic hose (not shown) comprising part of a conventional brake bleeding assembly (not shown). The bleeder valve 18 includes a hexagonal wrench engaging element 22. Rotation of the bleeder valve 18 in an unthreading direction moves the inner end 24 of the bleeder valve 18 away from a valve seat 26 which allows brake fluid to pass into an opening 28 and passage 30 to exit from the bleeder valve 18. Rotation of the bleeder valve 18 in a threading direction moves the inner end 24 into sealing engagement with the valve seat 26 and thus directs all brake fluid to the hydraulic motor comprising part of the brake assembly (not shown). Those skilled in the art will recognize the wheel cylinder 10 and the bleeder valve 18 as being representative of conventional modern brake equipment.

The brake bleeding tool 32 of this invention comprises, as major components, a hose 34 sized to slip over the tapered fitting 20 of the bleeder valve 18 and a check valve 36. As will be more fully apparent hereinafter, the hose 34 includes an air trap 38 for collecting air that migrates, by gravity, toward the wheel cylinder 10 when brake fluid flow in the hose 34 stops, as when the user quits pumping the brake pedal of the vehicle. The air trap 38 includes a transparent section 40 that allows the user to see if there is any air in the trap 38. The broad concept of this invention is to allow a single user to bleed air from the hydraulic line leading to the wheel cylinder 10 and to inspect the air trap 38 to determine if all of the air is out of the brake line.

To this end, the hose 34 includes an elastic hose end 42 which is typically an opaque rubber hose section because most transparent hoses are vinyl which have insufficient elasticity to slip easily over, and stay on, the fitting 20. A connection 44 attaches the hose end 42 to a transparent hose section 46. In addition, the connection 44 may be a reducer so the hose section 46 leading to the check valve 36 may be of different size than the hose end 42. To provide the air trap 38, the transparent hose section 46 is simply wound in at least one 360° loop with suitable hose clamps, flexible ties 48 or the like holding the loop in a permanently coiled position. It will be seen that the loop is permanent, i.e. it does not depend on a temporary coiling of the hose section 46 which may become uncoiled in use.

The check valve 36 is preferably of a diaphragm type which requires a low discharge pressure, preferably less than about 1 psi to deliver brake fluid from the check valve 36. As shown in FIG. 5, the check valve 36 is of a conventional type comprising an input fitting 50 connected to the hose section 46, a housing 52, a diaphragm 54 inside the housing 52 acting against a support 56 for discharging brake fluid through a coupling or cap 58 connected to a container 60. For a more complete description of the check valve 36, reference is made to U.S. Pat. No. 3,889,710, the disclosure of which is incorporated herein by reference. The pressure required to open the check valve 36 is so small that the force generated thereby and acting to pull the hose end 42 off the bleed fitting 20 is very small. For example, with a typical 3/16" hose end 42 and a check valve 36 requiring only 1 psi to open, the force applied to the hose end 42 before the check valve 36 opens is only: force=pressure×area=1 pound/square inch×3.1416×0.1825×0.1825/4=0.026 pound=0.4 ounces. This is a very small force indeed and there is almost no tendency of the hose end 42 to be pulled off the fitting 20 in response to pressure buildup inside the hose 34 after hydraulic fluid starts to flow in the wheel cylinder and before the check valve 36 opens. One suitable check valve for use in this invention may be obtained from Miniature Precision Components, Inc., Walworth, Wis. as Model A603.

In operation, the user slips the fitting end 42 of the tool 32 onto the bleed fitting 20 and uses a wrench on the wrench engaging portion 22 to unthread the bleed valve 18 and allow brake fluid to exit through the bleed fitting. Typically, the container 60 rests on the ground at an elevation below the wheel cylinder 10. The user gets into the vehicle and pumps the brakes until the user thinks sufficient brake fluid has passed through the bleed valve 18 to bleed air from the hydraulic line and wheel cylinder 10. When the user stops pumping the brake pedal, the check valve 36 prevents any backflow into the hose 34. Because the container 60 is normally on the ground and the wheel cylinder 10 is vertically above it, any air in the hose 34 migrates by gravity toward the wheel cylinder 10 but its movement is stopped by the air trap 38.

The user gets out of the vehicle and looks at the transparent loop comprising the air trap 38. If there are any air bubbles in the air trap 38, the user gets back into the vehicle and pumps the brake again. The process is repeated until no air bubbles are seen in the air trap 38.

It will be seen that air bubbles in the hose 34 tend to migrate by gravity toward the bleed fitting 20 when fluid flow in the hose 34 stops because the bleed fitting 20 is above the container 60 and the hose 34 simply hangs between them. One advantage of the 360° loop is that no particular precautions are needed to orient the loop. When the user starts pumping the brakes again, any air bubbles in the trap 38 are moved along with the brake fluid toward the container 60. Thus, the air trap 38 has the capability of flushing out or purging any air bubbles in response to brake fluid flow in the hose 34 toward the check valve 36.

Referring to FIG. 2, there is illustrated a slightly different air trap 62 that may be used in lieu of the 360° loop illustrated in FIG. 1. The air trap 62 includes a semi-circular loop in a flexible transparent hose 64. The loop is retained in the hose 64 by a flexible or rigid tie 66 comprising a pair of circular clamps 68 connected by a band 70. It will be seen that the loop provided by the air trap 62 is sufficient to retain air bubbles migrating by gravity toward the wheel cylinder 10 and then discharge the air bubbles to a container (not shown) in response to fluid flow in the hose 64.

Referring to FIG. 3, there is another example of an air trap 72 of this invention comprising a rigid, transparent plastic element providing a rigid tube 74 providing tapered fittings 76 on the ends thereof for connection to suitable hose sections (not shown). A gusset 78 may be provided. It will be seen that the loop provided by the air trap 72 is sufficient to retain air bubbles migrating by gravity toward the wheel cylinder and then discharge the air bubbles to a container (not shown) in response to fluid flow in the tube 74.

Referring to FIG. 4, there is illustrated another embodiment of a brake bleeding tool 80. The brake bleeding tool 80 is patterned after the device in U.S. Pat. No. 4,479,511, to which reference is made for a more complete understanding of the tool 80, except that an air trap is provided and pertinent parts of the device are transparent to allow visual inspection of the air trap.

To this end, the brake bleeding tool 80 comprises a coupler nut 82 threaded onto the end of a tube 84. The coupler nut 82 includes a shoulder 86 for abutting the large end of the tapered fitting 20. When the coupler nut 82 is threaded onto the tube 84, the fitting 20 is positioned in the inlet end 88 of the tube 84. The tube 84 provides an air trap 90 in the form of a bulbous passage connecting the inlet tube end 88 to a check valve. The coupler nut 82 and the tube 84 are made of a transparent organic plastic resin so the air trap 90 can be visually inspected for air bubbles.

The check valve may be of any suitable type and is shown as comprising a ball check 94 biased by a spring 96 against a valve seat 98. The end of the tube 84 is closed by a threaded nut 100 having an opening therethrough allowing brake fluid to exit into a hose (not shown) connected to a suitable container (not shown).

Operation of the brake bleeding tool 80 will be seen to be substantially identical to the tool 32. The bleeder valve 18 is opened by turning it with a wrench on the wrench engaging portion 22. The tube 84 is connected to the bleed valve 18 by unthreading the coupler nut 82 sufficient to allow the shoulder 86 to pass behind the shoulder of the tapered fitting 20. The coupler nut 82 is then threaded onto the tube 84 until a fluid tight connection is made between the fitting 20 and the tool 80. It will be noted that the bleed fitting 18 is essentially horizontal so the tube 84 is also essentially horizonal. The user gets inside the vehicle and pumps the brakes to move brake fluid through the brake bleeding device 80 to a suitable container (not shown). When the user thinks enough brake fluid has been pumped to discharge air from the hydraulic line leading to the wheel cylinder 10, the user gets out of the vehicle and looks at the transparent coupler nut 80 and transparent tube 84 to see if there are any air bubbles in the air trap 90. If there are, the user gets back into the vehicle and pumps the brakes some more. The process is repeated until no bubbles appear in the air trap 90.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A method of bleeding brake fluid from a hydraulic line leading from a master cylinder to a wheel cylinder having a brake fluid bleed fitting using a tool comprising a tool fitting for connection to the brake fluid bleed fitting on the wheel cylinder, a check valve allowing flow of brake fluid away from the tool fitting and preventing reverse flow, means connecting the tool fitting and the check valve for transmitting brake fluid from the tool fitting to the check valve and a permanent air trap preventing air bubbles from moving by gravity into the wheel cylinder upon cessation of brake fluid movement from the wheel cylinder toward the check valve, the air trap having a transparent section for visually determining the presence of air collected in the air trap, the steps conducted by a single person comprising attaching the tool fitting to the brake bleed fitting and manipulating the brake bleed fitting to allow brake fluid to enter the tool, then repeatedly depressing a brake pedal and initially delivering brake fluid and air through the tool, then stopping movement of the brake pedal and collecting air in the air trap as air bubbles in the connecting means move by gravity toward the wheel cylinder, then visually determining the absence of air in the air trap, and then manipulating the brake bleed fitting to prevent brake fluid from leaving the wheel cylinder, whereby one person can bleed air from the brake line and visually determine if all of the air is out of the brake line.

2. The method of claim 1 further comprising, after the stopping step, visually determining the presence of air in the air trap and then redepressing the brake pedal and redelivering brake fluid through the tool, the step of visually determining the absence of air in the air trap being after the step of redelivering brake fluid through the tool.

3. The method of claim 2 wherein the step of redelivering brake fluid through the tool comprises purging the air trap of air therein.

4. A tool for bleeding brake fluid from a hydraulic line leading from a master cylinder to a wheel cylinder having a brake fluid bleed fitting providing a generally frustoconical connector, comprising a tool fitting including a bodily flexible tubular end for slipping over the generally frustoconical end of the brake fluid bleed fitting;

a hose connected to the tool fitting for transmitting brake fluid away from the tool fitting; and a check valve comprising a housing having an input end connected to the hose, an output end and a movable diaphragm acting as a check valve allowing brake fluid flow from the tool fitting toward the check valve and preventing brake fluid flow from the check valve toward the tool fitting, the movable diaphragm requiring less than 1 psi pressure differential to move to an open position allowing fluid flow from the tool fitting toward the check valve so the tubular end of the tool fitting does not pull off the frustoconical connector in response to pressure generated before the check valve opens and the master cylinder is delivering brake fluid toward the wheel cylinder.

5. A tool for bleeding brake fluid from a hydraulic line leading from a master cylinder to a wheel cylinder having a brake fluid bleed fitting, comprising a tool fitting for connection to the brake fluid bleed fitting on the wheel cylinder;

a check valve allowing flow of brake fluid away from the tool fitting and preventing reverse flow;

means connecting the tool fitting and the check valve for transmitting brake fluid from the tool fitting to the check valve; and a permanent air trap preventing air bubbles from moving by gravity into the wheel cylinder upon cessation of brake fluid movement from the wheel cylinder toward the check valve, the air trap having a transparent section for visually determining the presence of air collected in the air trap whereby one person can bleed air from the brake line and visually determine if all of the air is out of the brake line.

6. The brake bleeding tool of claim 5 wherein the air trap is in the connecting means.

7. The brake bleeding tool of claim 6 wherein the air trap comprises a transparent loop.

8. The brake bleeding tool of claim 7 wherein the loop is a closed loop.

9. The brake bleeding tool of claim 5 wherein the connecting means is a hose and the air trap comprises a loop in the hose and the loop is made permanent by means immobilizing the loop.

10. The brake bleeding tool of claim 9 wherein the transparent section comprises a transparent section of the loop.

11. The brake bleeding tool of claim 10 wherein the loop is a flexible section of the hose.

12. The brake bleeding tool of claim 10 wherein the loop is a rigid section of the hose.

13. The brake bleeding tool of claim 5 wherein the connecting means is a rigid connection having a horizontal passage therethrough and the air trap comprises an enlarged section of the horizontal passage for collecting air in brake fluid in the passage.

14. The brake bleeding tool of claim 5 wherein the air trap comprises means to purge the air trap of air in response to brake fluid flowing from the tool fitting toward the check valve.

\* \* \* \* \*